United States Patent [19]

DeSmit

[11] 4,036,177
[45] July 19, 1977

[54] BIO-TEST CAGE AND SUPPORT THEREFOR

[75] Inventor: Phillip A. DeSmit, Portage, Mich.

[73] Assignee: Unifab Corporation, Kalamazoo, Mich.

[21] Appl. No.: 657,969

[22] Filed: Feb. 13, 1976

[51] Int. Cl.² .............................................. A01K 1/02
[52] U.S. Cl. ..................................................... 119/18
[58] Field of Search .................... 119/18, 17, 72.5, 22, 119/48

[56] References Cited

U.S. PATENT DOCUMENTS

| | | | |
|---|---|---|---|
| 3,292,581 | 12/1966 | Van Nest | 119/17 |
| 3,431,891 | 3/1969 | Boegli et al. | 119/72.5 |
| 3,585,968 | 6/1971 | Stone, Jr. | 119/18 |
| 3,707,949 | 1/1973 | Lippi | 119/18 |
| 3,727,582 | 4/1973 | Heying et al. | 119/18 |
| 3,779,210 | 12/1973 | Blair | 119/18 |

*Primary Examiner*—Hugh R. Chamblee
*Attorney, Agent, or Firm*—Blanchard, Flynn, Thiel, Boutell & Tanis

[57] ABSTRACT

An animal confining and housing device having a wheel supported carriage with a plurality of two sets of vertically spaced and parallel guide members thereon. A plurality of animal confining cages are movably mounted on one of the sets of guide members. The cages have a water supply system thereon for supplying water to the interior thereof. A flexible hose extends between the cages and the main water supply for facilitating (1) a relative movement between the cages and the carriage and (2) a supply of water from the main water supply to the water supply system on the cages. A releasable coupling is provided for permitting a disconnection between the flexible hose and the main water supply to facilitate a removal of the cage from the carriage for transport to a location remote from the carriage. Each of the cages has a plurality of compartments located therein, which compartments are located on opposite sides of a food trough. A passageway extends between the food trough and each of the compartments to facilitate the removal of food from the food trough by animals in the compartments. A tray is provided beneath the cages for catching the excretive material from the animals housed in the cages.

8 Claims, 10 Drawing Figures

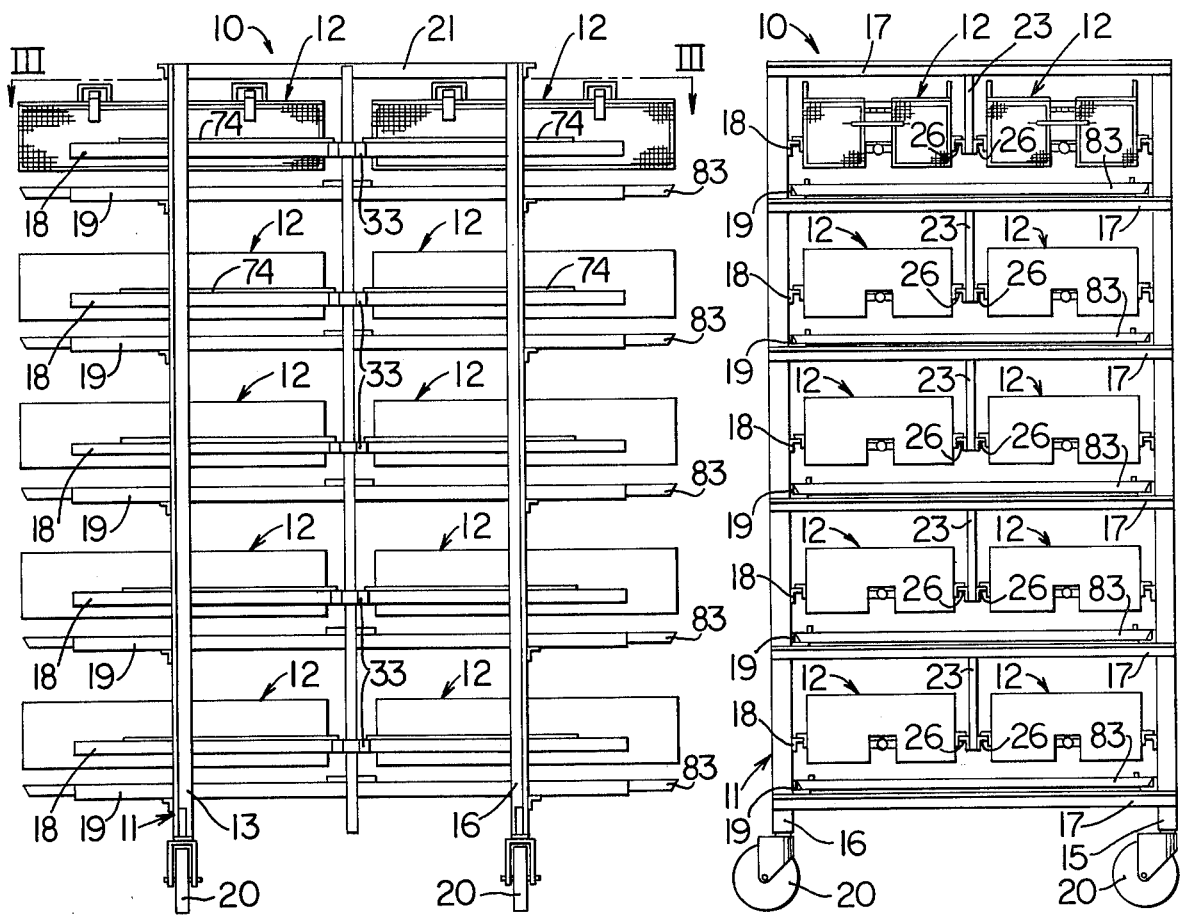
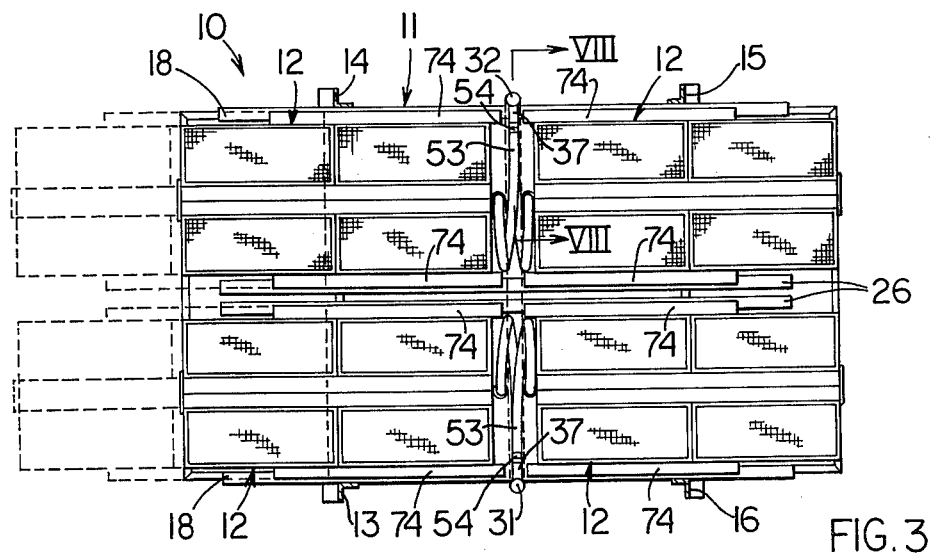

BIO-TEST CAGE AND SUPPORT THEREFOR

FIELD OF THE INVENTION

This invention relates to an animal confining and housing device and, more particularly, relates to an arrangement for facilitating the easy handling of a plurality of cages, which arrangement has a water supply system associated therewith for supplying water to each of the individual cages. The water supply line may be disconnected to facilitate a removal of the cage to a location remote from the carriage.

This invention also relates to a portable animal confining cage structure having embodied thereon a water supply arrangement.

BACKGROUND OF THE INVENTION

Systems are known for housing a plurality of animals in individualized compartments. However, the devices which are now known to exist cost a substantial amount of money to construct and maintain on a per-animal-housed basis. As the study of our environment increases, toxicological services are performed by various industries to determine the affect of the environment on our lives. These services utilize a plurality of cage structures for housing test animals, such as rats and the like. The cage structures which are known do not incorporate advantageous features which minimize the care required in housing the animals. Accordingly, it is desirable to provide an animal confining and housing device which will lower the cost of maintaining the animals in a specified environment.

Accordingly, it is an object of this invention to provide an animal confining and housing device having a carriage and a plurality of animal confining cages removably mounted on the carriage, each cage having a flexible hose for connecting the main water supply to the water supply system on the cage to supply water from the main water supply to the water supply system on the cage and to facilitate the aforesaid relative movement between the cage and the carriage.

It is a further object of this invention to provide a quick disconnect coupling in the water supply to facilitate a removal of the cages from the carriage for transport to a location remote from the carriage.

It is a further object of this invention to provide a cage structure having a water supply system fixedly mounted thereon, which water supply system remains with the cage even when the cage is removed from the carriage.

It is a further object of the invention to provide a cage structure having a plurality of individual compartments therein, each having a water supply valve operable by an animal present in a compartment to release water for consumption by the animal.

It is a further object of this invention to provide an animal confining and housing device, as aforesaid, wherein the cage is composed of a pair of rows of separate compartments mounted on opposite sides of an elongated trough with a passageway being provided between the food trough and the interior of each of the compartments to facilitate the easy feeding of the animals contained within the compartments.

It is a further object of this invention to provide an animal confining and housing device as aforesaid, wherein groups of the aforesaid compartments have a common removable cover so that when the cover is opened, several of the compartments will be exposed so that the toxicologist can, for example, remove an animal from one compartment with one hand while holding animals in the other compartment with the other hand.

SUMMARY OF THE INVENTION

In general, the objects and purposes of the invention are met by providing a carriage having a plurality of animal confining cages mounted thereon, which cages have a water supply system thereon for supplying water to the interior of the cages. The carriage has a main water supply mounted thereon and a flexible hose extends between the main water supply on the carriage and the water supply system on the cages for facilitating (1) a relative movement between the cages and the carriage and (2) a supply of water from the main water supply to the water supply system on the cages. A releasable coupling is provided in the water supply system to facilitate a removal of the cage from the carriage so that the cage can be transported to a location remote from the carriage. The water supply system remains with the cage during the aforesaid transporting. The cage has a plurality of rows of compartments mounted on opposite side of a food trough. A plurality of passageways are provided between the food trough and each of the compartments to facilitate the removal of food from the food trough by the animal in the compartment.

BRIEF DESCRIPTION OF THE DRAWINGS

Further objects and purposes of this invention will be apparent to persons acquainted with apparatus of this general type upon reading the following specification and inspecting the accompanying drawings, in which:

FIG. 1 is a front elevational view of a carriage having a plurality of animal confining cages mounted thereon;

FIG. 2 is a right end view of the embodiment illustrated in FIG. 1;

FIG. 3 is a view taken along the line III—III in FIG. 1;

Figure 4:
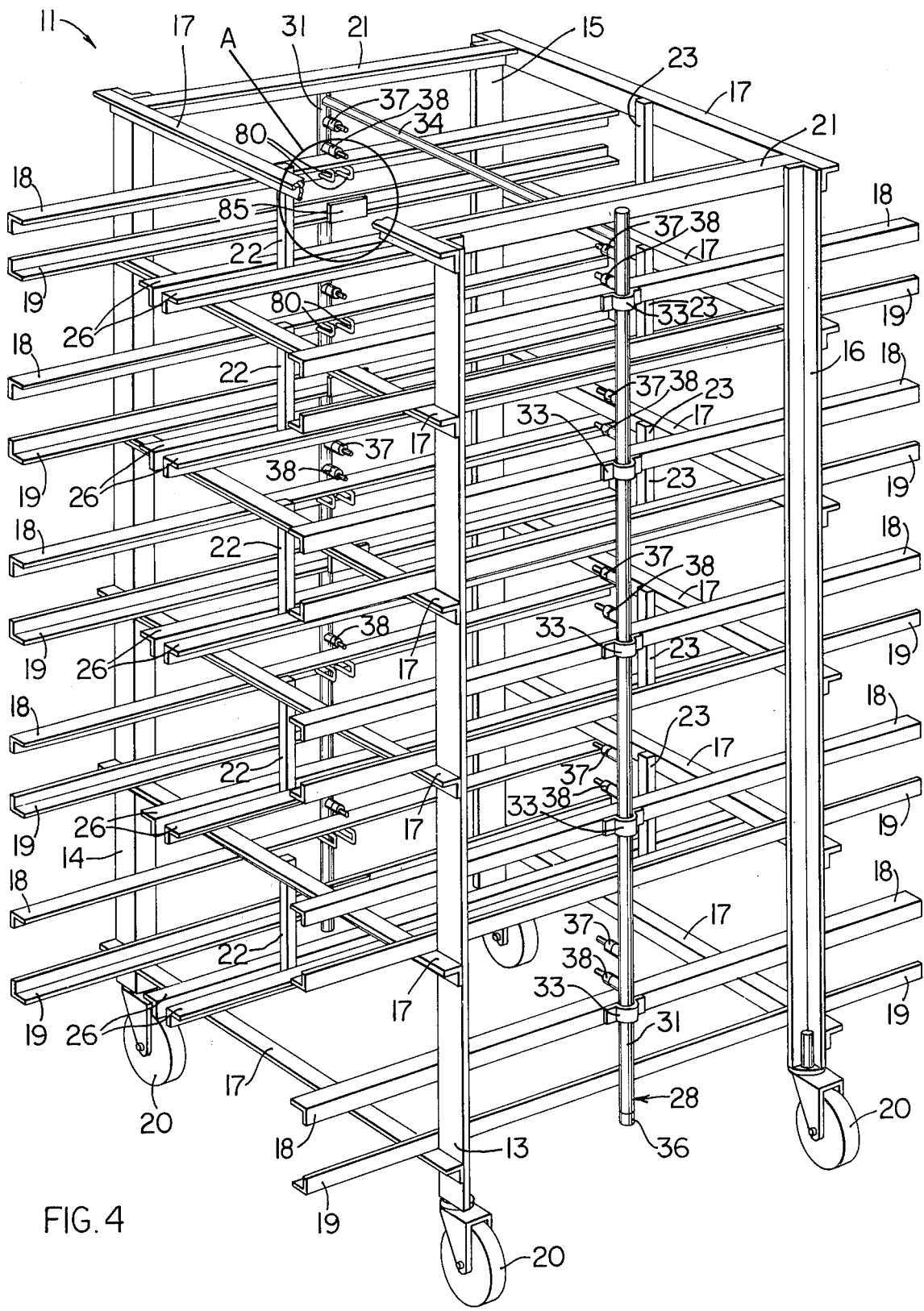
FIG. 4 is a perspective view of the aforesaid carriage without any animal confining cages thereon.

Certain terminology will be used in the following description for convenience in reference only and will not be limiting. The words "up", "down", "right" and "left" will designate directions in the drawings to which reference is made. The words "in" and "out" will refer to directions toward and away from, respectively, the geometric center of the device and designated parts thereof. Such terminology will include the words above specifically mentioned, derivatives thereof and words of similar import.

DETAILED DESCRIPTION

The animal confining and housing device 10 is composed of a carriage 11 supporting a plurality of cage structures 12 thereon. The carriage 11 (FIG. 4) has four vertically upstanding and parallel corner members 13, 14, 15 and 16. The corner members 13 and 16 are maintained in a horizontally spaced and parallel relationship to the corner members 14 and 15 by a plurality of parallel cross members 17 which are secured to and extend between the corner members 13, 14 and the corner members 15, 16. The corner member pairs 13, 16 and 14, 15 are further maintained in an upright and parallel relation by a plurality of sets of vertically spaced guide members 18 and 19 which are secured thereto and extend therebetween generally at right angles to the cross members 17. The guide members 18 secured to and extending between the corner members 14, 15 are parallel to and contained in a horizontal plane with the guide members 18 which are secured to and extend between the corner members 13, 16. Similarly, the guide members 19 which are secured to and extend between the corner members 14, 15 are parallel to and are contained in a horizontal plane with the guide members 19 which are secured to and extend between the corner members 13 and 16. Each of the guide members 18, 19 has an upwardly facing surface which defines a support surface. The carriage is further rigidified by the provision of a cross member 21 which is secured to and extends between the upper ends of the corner members 14, 15 and the corner members 13, 16. A castor wheel 20 is pivotally secured to the lower end of each of the corner members 13, 14, 15 and 16.

A support post 22 is secured to the cross members 17 which extend between the corner members 13, 14 and extend downwardly therefrom to a location which is spaced above the next cross member spaced therebelow. There is no support post extending downwardly from the bottom-most cross member. Similarly, a support post 23 is secured to and extends downwardly from the cross members 17 which are secured to and extend between the corner members 15 and 16. There is no support post 23 extending downwardly from the bottom-most cross member 17 extending between the corner members 15 and 16. A pair of elongated and back-to-back guide members 26 are secured to each pair of support posts 22, 23 and extend therebetween so that the upper facing surface contained thereon is coplanar with the upper upwardly facing surface of the guide members 18. Thus, the upwardly facing surface on the guide members 18 and 26 define a support structure for the cages which will be described in more detail below.

A main water supply system 28 is mounted on the carriage 11. The main water supply system 28 incldues a vertically upstanding conduit 31 extending between and parallel to the corner members 13, 16 and another vertically upstanding conduit 32 extending between and parallel to the corner members 14, 15. Each of the conduits 31 and 32 is secured by a bracket 33 to one of the guide members, here guide member 18 in each of the sets of guide members. A conduit 34 is connected to and extends between the upper end of the conduits 31 and 32 so that fluid communication is provided between the upstanding conduits 31 and 32. A quick diconnect coupling 36 is provided on the lower end of one of the conduits, here conduit 31, to facilitate the supply of water to the main water supply system on the carriage. Vertically spaced pairs of one-half of a quick disconnect coupling 37 and 38 are connected to each of the conduits 31 and 32 and are located between the upper surface of each guide member 18 but below the next above guide member 19 if another guide member 19 is located thereabove. Obviously, the uppermost guide member 18 on the carriage 11 has no guide member 19 thereabove but the couplings 37 and 38 are spaced below the cross members 21.

Figure 7:
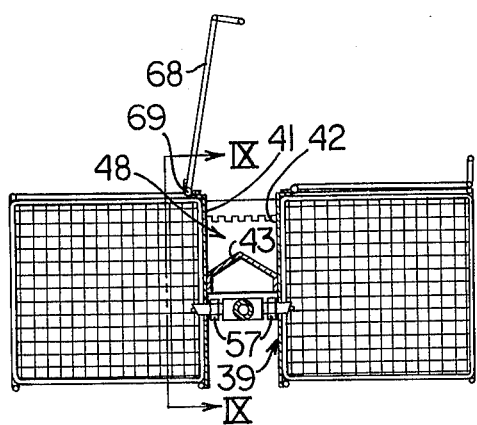
FIG. 7 is a sectional view taken along the line VII—VII in FIG. 6.
Figure 10:
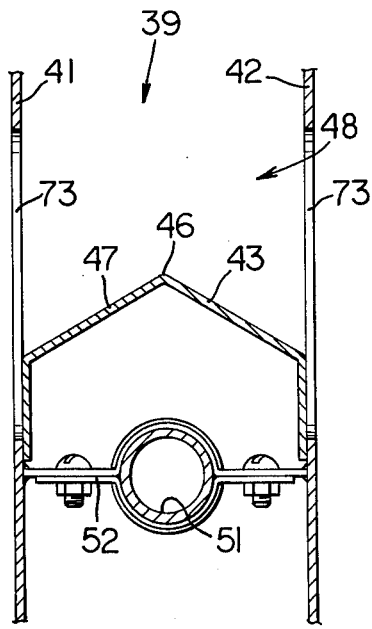
FIG. 10 is a sectional view taken along the line X—X in FIG. 9.

Referring now to the cage structure 11, the cage is composed of a frame 39 (FIGS. 7 and 10) which includes a pair of parallel and horizontally spaced plates 41 and 42 secured together by an elongated generally inverted V-shaped member 43 which has a pair of legs 44 and 45 which extend parallel to the plates 41 and 42 and are secured to the plates at a location intermediate the upper and lower edges of the plates 41 and 42. The apex 46 of the V-shaped member 43 is spaced below the upper edge of the plates 41 and 42. As a result, the upper surfce surface of the V-shaped member 43 and the inwardly facing walls of the plates 41 and 42 above the V-shaped member 43 define a trough 48. A conduit 49 extends beneath the V-shaped member 43 and is secured to and supported by a bracket 51 to both of the plates 41 and 42. A coupling 52 (FIG. 8) is connected to one end of the conduit 49, which coupling 52 is in fluid connection with a flexible hose 53. The flexible hose 53 has on the end remote from the coupling 52 one-half of a quick disconnect coupling 54 (FIG. 8) which is adapted to mate with the other half of the quick disconnect coupling 37 or 38 secured to one of the conduits 31 and 32.

A plurality of opening 56 (FIGS. 8 and 9) are provided in the plates 41 and 42 (only an opening 56 is shown in the plate 41). A plurality of water control valves 57 are connected in fluid circuit with the conduit 49 and extend through the openings 56. Each of the water control valves has a stem 58 which is operable by applying pressure thereto to open the valve to facilitate the flow of water therethrough.

The cage 11 is also composed of a plurality of animal confining compartments 61 mounted on both sides of the trough 48. More specifically, the compartments 61 are constructed of a generally U-shaped frame 62 having a wire mesh bottom wall 63 and wire mesh end walls 64 and 65. The bottom wall 63 is generally horizontal and extends perpendicularly outwardly from the plates 51 and 42. Similarly, the end walls 64 and 65 also extend perpendicularly outwardly from the plates 41 and 42 and extend upwardly from the bottom wall generally perpendicularly thereto. The edge of the bottom wall 63 and the edges of the end walls 64 and 65 adjacent the plates 41 and 42 are secured by any convenient means, as by welding, to the plates 41 and 42. A wire mesh sidewall 66 is secured to and extends between the edge of the end walls 64 and 65 remote from the plates 41 and 42 and the edge of the bottom wall 63 remote from the plates 41 and 42. Thus, the end walls 64, 65, the bottom wall 63, the sidewall 66 and the plates 41 and 42 define an elongated compartment on opposite side of the trough 48. A plurality of intermediate separating walls 67 having a wire mesh construction are placed in the elongated compartment to divide the elongated compartment into the aforesaid individual compartments 61. The separating walls 67 are secured to the plates 41 and 42 along one edge thereof, the bottom wall 63 and the sidewall 66.

Figure 5:
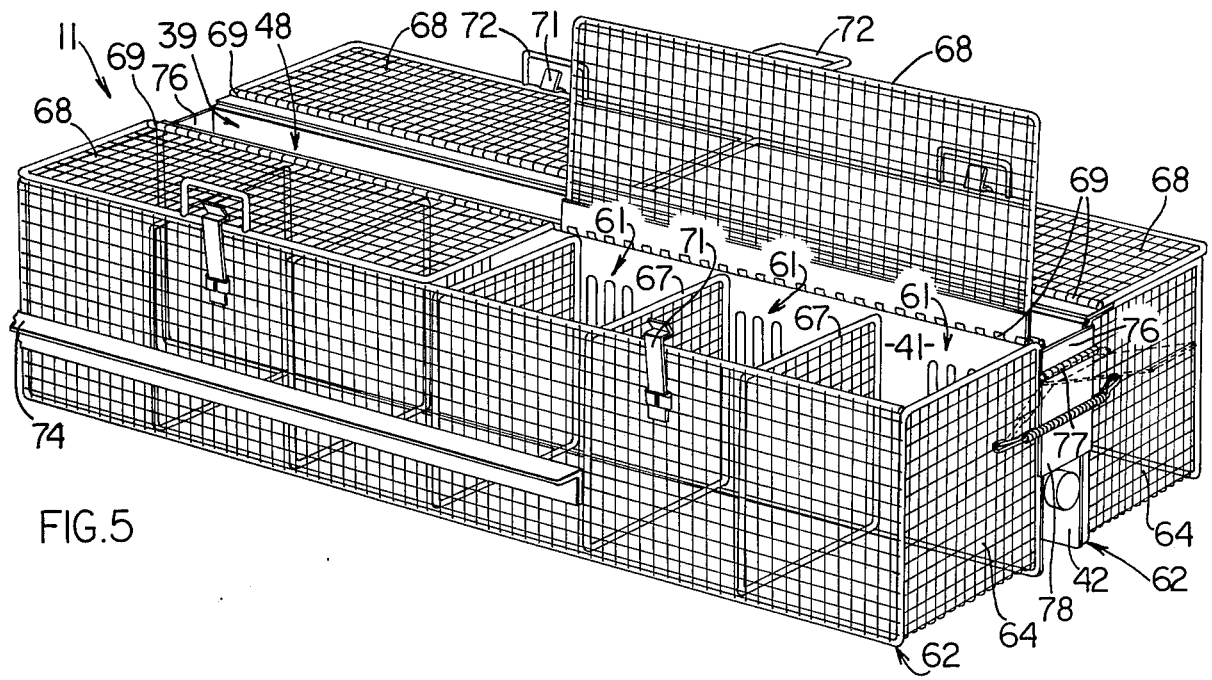
FIG. 5 is a perspective view of an animal confining cage.

A plurality of wire mesh covers are hingedly secured to the upper edge of each of the plates 41 and 42 by a hinge 69. Each of the covers 68, in this particular embodiment, are adapted to cover three compartments 61 when in the closed position. A plurality of spring clips 71 are secured to the sidewall 66 to lock the cover 68 in the closed position. A handle 72 is secured to the cover 68 to facilitate a movement the cover 68 between the closed position and the opened position. In this particular embodiment, each cage 11 is composed of four sections, two sections one each side of the trough 48, each section containing three compartments 61 such as is illustrated in FIG. 5. Each section also has a cover 68 covering the three compartments 61. Further, it is to be noted that the positioning of the separating walls 67 is such that access is provided to the water control valve 57 in each compartment 61. In addition, a plurality of openings 73 are provided in the plates 41 and 42 so that access to food placed in the trough 48 is made available in each of the compartments 61 (see FIG. 9). It is to be recognized that the length of the covers 68 can be varied so that varying numbers of individual compartments 61 can be covered thereby. For example, the covers 68 could be designed to cover only two compartments 61 or even one compartment.

Figure 6:
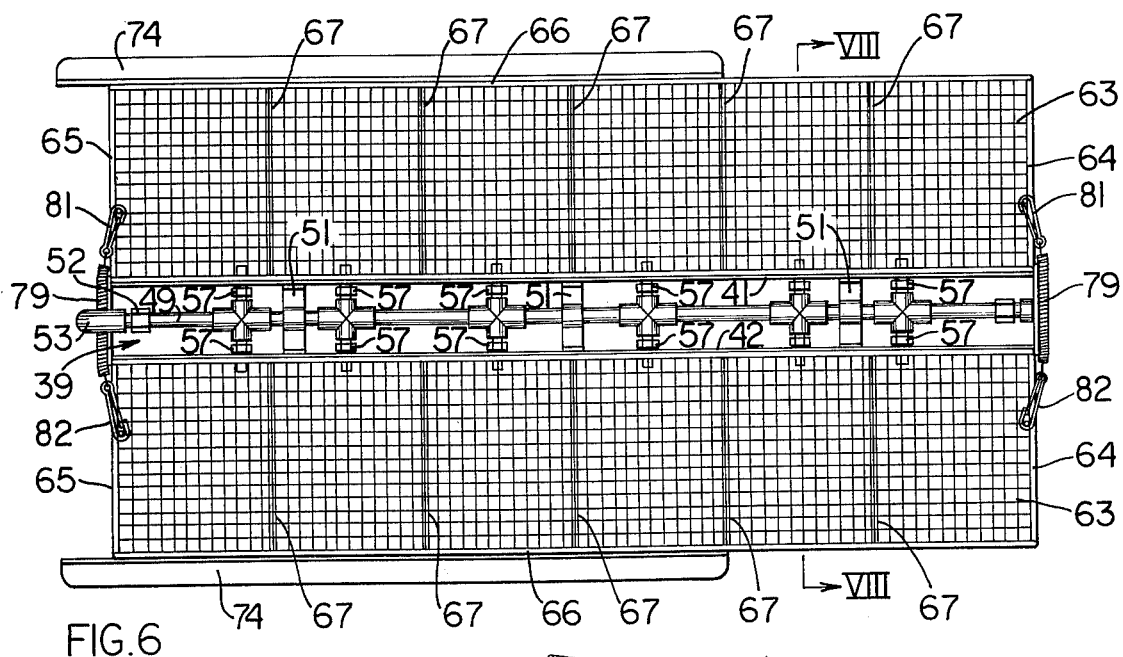
FIG. 6 is a bottom view of the animal confining cage.

A pair of elongated slide bars 74 are secured to the sidewalls 66 as illustrated in FIG. 6. The slide bars 74 extend parallel to the plane of the bottom wall 63 and over most of the length of the sidewall 66. The slide bars also project beyond the end wall 65 as best illustrated at the left end of FIG. 6.

At each end of the trough 48, a plate 76 is secured to and extends between the plates 41 and 42 with the lower edge thereof having one-half of a hinge 77 thereon. A flap 78 having the other half of the hinge 77 mounted along the upper edge thereof is pivotally secured to the plate 76 through the hinge 77 and is pivotal between the solid line position and the broken line position illustrated in FIG. 5. A spring member 79 having clips 82 on opposite ends thereof clipped to the end walls 64 and the end walls 65 overlays the flap 78 to hold the flap 78 in the closed solid line position illustrated in FIG. 5. A movement of the flap 78 toward the broken line position illustrated in FIG. 5 will be permitted against the urging of the spring 79. It is to be noted that the spring 79 and clips 81 and 82 are provided at both ends of the trough 48 as best illustrated in FIG. 6. Thus, food in the trough 48 can be removed by sliding a shoe along the trough to move the food out through the opened gates.

The cage 12 is supported on the carriage in the following manner. The slide bars 74 are positioned so that they are spaced slightly above the upper upwardly facing surfaces of the guide members 18 and 26. Thereafter, the slide bars 74 may be slid along the upper surface of the guide members 18 and 19 to the position illustrated in FIGS. 1 to 3 until the slide bar engages a stop 80 illustrated in FIG. 8 and the encircled part A in FIG. 4. The broken line representation in FIG. 3 represents the manner in which the cages 12 are movable relative to the carriage 11. Once the cage 12 is in place on the carriage 11, the flexible hose 53 may be coupled via the quick disconnect couplings 54 and 37 or 38 to facilitate a supply of water from the main water supply system 28 and each of the individual compartments 61 in the cage structure 12. Similarly, a disconnection of the coupling components 54 and 37 or 38 will result in the cage being capable of movement from a support on the carriage and carried to a location remote from the carriage. Thus, a quantity of animals housed within one of the cages may be carried to a desired testing locale within the laboratory so that the animals will be conveniently available adjacent a piece of testing equipment. The quick disconnect couplings also have valving therein to prevent a leakage of water therefrom upon the disconnection.

Figure 8:
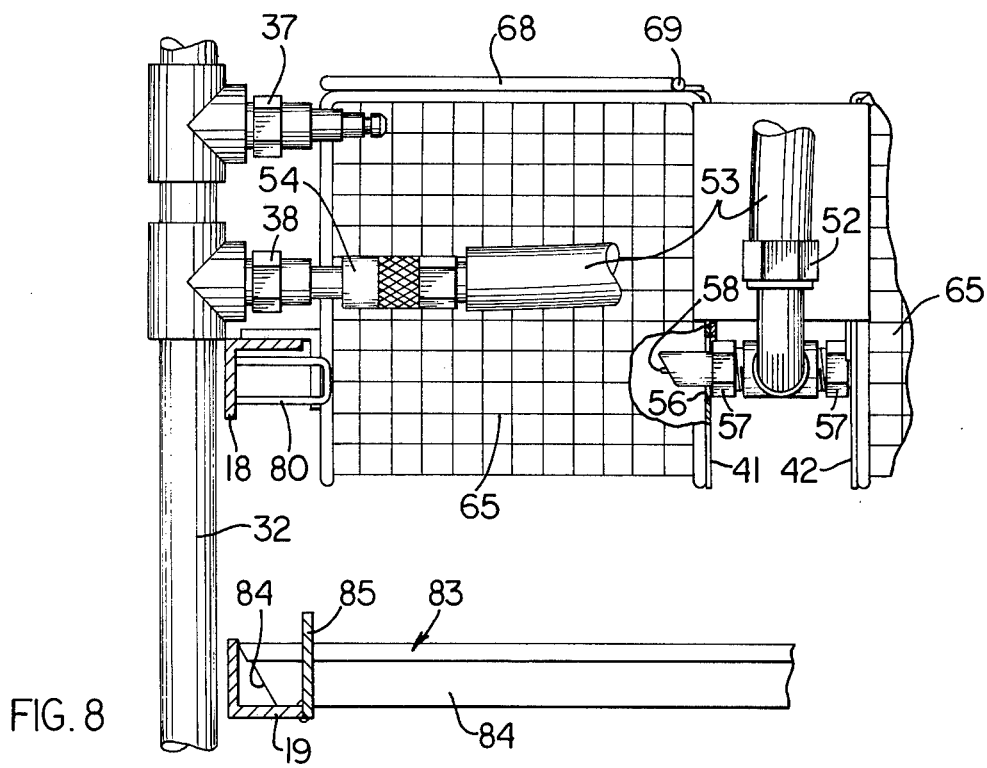
FIG. 8 is a sectional view taken along the line VIII—VIII in FIG. 3.
Figure 9:
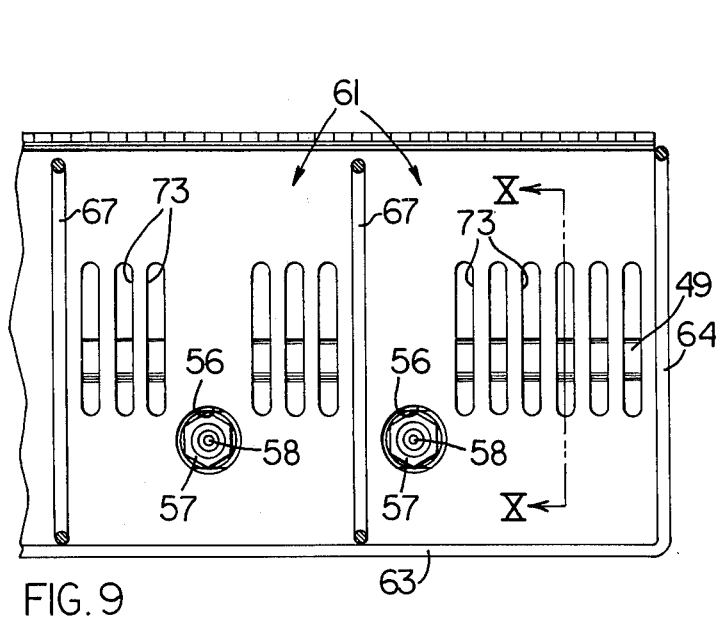
FIG. 9 is a sectional view taken along the line IX—IX in FIG. 7.

A tray 83 having upstanding sidewalls, 84 thereon is supported on the upper surface of the guide members 19. The trays 83 are positioned just below the bottom wall 63 of the compartmentized cages and catch the excretive material from the animals housed within the compartments. In addition, the tray 83 may be slid along the upper surface of the guide members 19 to facilitate a removal of the tray and a cleaning thereof at periodic intervals. The tray may be moved independently of the cage structure and the movement is limited in one direction by stops 85 as illustrated in FIG. 8 and the encircled part of FIG. 4. In this embodiment, two trays 83 are supported on each pair of coplanar guide members 19, each tray collecting excretive material from two cages 12.

It is to be noted that a plurality of cages 12 are literally stacked one on top of the other with a spacing being provided therebetween to facilitate the unobstructed movement of air therearound thereby keeping the animals supplied with adequate quantities of fresh air. In addition, an effort has been made to maximize the number of compartments capable of holding animals and maintaining them in such an environment whereby air is able to freely circulate therearound and keep the animals in a healthy condition.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. An animal confining and housing device, comprising:

carriage means having a first set of a plurality of vertically spaced and parallel guide members;

a plurality of animal confining cages movably mounted on said set of parallel guide members, said plurality of cages each having first water supply means fixedly mounted thereon for supplying water to the interior of said cages, at least one of said cages having a plurality of compartments therein, each separate from the other, said plurality of compartments being located in a pair of parallel rows and has a food trough positioned between said rows and secured to said compartments, means defining a passage between said food trough and each of said compartments to facilitate the removal of food from said food trough by said animal in said compartment;

continuously pressurized second water supply means mounted on said carriage means for continuously supplying water to said animal confining cages;

flexible hose means extending between said first and second water supply means for facilitating (1) a relative movement between said cages and said carriages means and (2) a supply of water from said second water supply means to said first water supply means, said flexible hose means including a separate flexible conduit connected between said first water supply means on each of said plurality of cages and said second water supply means, said first water supply means including valve means in at least one of said compartments operable by an animal present in said one compartment to release water for consumption by the animal; and releasable coupling means for permitting a disconnection between said flexible hose means and one of said first and second water supply means, a disconnection of said releasable coupling means facilitating a removal of said cages from said carriage means for transport to a location remote from said carriage means, said releasable coupling means including a quick disconnect coupling located between said flexible conduit on each of said plurality of cages and said second water supply means, said quick disconnect coupling including shut off valve means to prevent the leakage of water from said first and second water supply means when a disconnection at said quick disconnect coupling occurs so that the water supply to the remaining cages remains uninterrupted during the time that the first water supply means on one or more cages are disconnected from said second water supply means.

2. An animal confining and housing device according to claim 1, wherein said carriage means includes a wheel supported frame.

3. An animal confining and housing device according to claim 1, wherein a common closable access opening is provided for a group of said compartments.

4. An animal confining and housing device according to claim 1, including a second set of a plurality of vertically spaced and parallel guide members mounted on said carriage means and parallel to said first set of guide members, each second set of guide members being spaced below a respective one of said first set of guide members; and further including a plurality of trays movably mounted on said second set of guide members to catch the excretive material from the animals housed in said cages.

5. An animal confining and housing device, comprising:

elongated frame means, said elongated frame means including at least one elongated food trough means fixedly secured to said frame means for holding a supply of food therein;

at least a pair of rows of separate compartments fixedly secured to said frame means and extending coextensively with said elongated food trough means and on opposite sides of said elongated food trough;

means defining a passageway in a wall between said food trough means and the interior of said compartments;

separate removable cover means for said compartmens in said rows to permit access to the interior of said compartments and an animal contained therein; and water supply means fixedly connected to said frame means between said pair of rows below said food trough means and releasable coupling means connected in fluid circuit with said water supply means for securing said water supply means to a source of water, said water supply means including valve means in a plurality of said compartments positioned on said wall adjacent said passageway means and being operable by an animal present in said plurality of compartments to release water for consumption by the animal.

6. An animal confining and housing device according to claim 5, wherein separate removable cover means includes a plurality of removable covers in each row, each covering a plurality of compartments in said rows.

7. An animal confining and housing device according to claim 5, including pivotal gate means at at least one end of said elongated food trough means to facilitate a removal of food therethrough, said gate means being pivotal between open and closed positions; and including resilient means for resiliently holding said pivotal gate means in said closed position.

8. An animal confining and housing device according to claim 7, wherein said food trough means includes an inverted shaped V-shaped bottom wall.

* * * * *

UNITED STATES PATENT AND TRADEMARK OFFICE
CERTIFICATE OF CORRECTION

PATENT NO. : 4 036 177
DATED : July 19, 1977
INVENTOR(S) : Phillip A. DeSmit

It is certified that error appears in the above-identified patent and that said Letters Patent are hereby corrected as shown below:

```
Column 1, Line 24; change "affect" to ---effect---.
Column 1, Line 51; change "the" to ---this---.
Column 2, Line  3; change "compartment" to ---compartments---.
Column 4, Line 13; change "surfce surface" to ---surface 47---.
Column 4, Line 25; change "opening" to ---openings---.
Column 4, Line 40; change "51" to ---41---.
Column 4, Line 52; change "side" to ---sides---.
Column 4, Line 67; after "movement" insert ---of---.
Column 5, Line  2; change "one" to ---on---.
Column 5, Line 30; after "clips" insert ---81 and---.
```

Signed and Sealed this

Twenty-fifth Day of October 1977

[SEAL]

Attest:

RUTH C. MASON
*Attesting Officer*

LUTRELLE F. PARKER
*Acting Commissioner of Patents and Trademarks*